United States Patent [19]

Zayhowski

[11] Patent Number: 5,381,431
[45] Date of Patent: Jan. 10, 1995

[54] PICOSECOND Q-SWITCHED MICROLASERS

[75] Inventor: John J. Zayhowski, Pepperell, Mass.

[73] Assignee: Massachusetts Institute of Technology, Cambridge, Mass.

[21] Appl. No.: 106,229

[22] Filed: Aug. 13, 1993

[51] Int. Cl.⁶ ............................................. H01S 3/10
[52] U.S. Cl. ................................. 372/25; 372/108; 372/99; 372/92; 372/69; 372/39; 372/12; 372/10
[58] Field of Search ...................... 372/25, 12, 10, 39, 372/41, 92, 69, 99, 108, 19, 22

[56] References Cited

U.S. PATENT DOCUMENTS

| Re. 34,192 | 3/1993 | Baer | 372/10 |
|---|---|---|---|
| 4,309,998 | 1/1982 | Aron nee Rosa et al. | 128/303.1 |
| 4,391,275 | 7/1983 | Frankhauser et al. | 128/303.1 |
| 4,479,220 | 10/1984 | Bor et al. | 372/25 |
| 4,667,331 | 5/1987 | Alferness et al. | 372/12 |
| 4,982,405 | 1/1991 | Zayhowski et al. | 372/10 |
| 5,172,391 | 12/1992 | Zayhowski | 372/19 |
| 5,243,611 | 9/1993 | Huga | 372/22 |

OTHER PUBLICATIONS

"Microchip Lasers", Zayhowski, J. J., *The Lincoln Laboratory Journal*, vol. 3, No. 3, 1990, pp. 427–446.

"Diode–pumped microchip lasers electro–optically Q switched at high pulse repetition rates", Zayhowski et al., *Optic Letters*, vol. 17, No. 17, Sep. 1, 1992, pp. 1201–1203.

"Optimization of Q-Switched Lasers", Zayhowski et al., *IEEE Journal of Quantum Electronics*, vol. 27, No. 9, Sep. 1991, pp. 2220–2225.

*OSA Proceedings on Advanced Solid-State Lasers*, vol. 6, edited by H. P. Jenssen and G. Dubé (Optical Society of Americal, Washington, D.C., 1991), pp. 9–13.

Zayhowski, J. J. et al., "Gain-Switched Pulsed Operation of Microchip Lasers," *Optic Letters*, 14 (23):1318–1320 (1989, Dec. 1).

*Primary Examiner*—Léon Scott, Jr.
*Attorney, Agent, or Firm*—Hamilton, Brook, Smith & Reynolds

[57] ABSTRACT

A Q-switched laser having a gain medium disposed within a first resonant cavity and a second resonant cavity, sharing a common mirror with the first cavity, whose optical length is adjustable such that the quality Q of the first resonant cavity is affected. One aspect of the invention is the selection of the cavity lengths and the reflectivities of the mirrors of the first and second cavity such that Q-switched pulses of less than 100-ps duration can be obtained. Another aspect of the invention is the ability to generate said pulses with peak powers in excess of 100 kW for applications in high-precision optical radar, nonlinear optics, micromachining, microsurgery, and other applications where short pulses with high peak powers are required.

25 Claims, 1 Drawing Sheet

PICOSECOND Q-SWITCHED MICROLASERS

The Government has rights in this invention pursuant to Contract Number F19628-90-C-0002 awarded by the Department of the Air Force.

BACKGROUND OF THE INVENTION

This invention relates to the field of lasers.

Many applications require the generation of extremely short, high-peak-power pulses of light from a laser. Extremely short pulses refer to pulse durations of less than 100 ps. High-peak-powers will refer to peak powers of greater than 100 kW. One method for producing extremely short pulses is to mode-lock the laser. In mode-locking, several longitudinal modes of a laser are locked together such that a periodic train of extremely short pulses is produced. The period between pulses is the round-trip time of the laser cavity, typically 10 ns. Because of the large number of pulses produced each second, even lasers with high average power (10-100 W or greater) can not produce pulses with high peak powers.

High-peak-power pulses can be produced by Q switching a laser. In Q switching, the Q or "quality" of the laser cavity is changed in order to generate a pulse. The size of conventional Q-switched lasers, along with the physics of the device, precludes the production of extremely short pulses.

Extremely short, high-peak-power pulses can be obtained from either Q-switched mode-locked lasers or amplified mode-locked lasers. Both of these approaches require large (typically several feet long), complicated (requiring daily supervision by a qualified laser technician), power-hungry (several kilowatts of electrical power), and therefore, expensive devices.

SUMMARY OF THE INVENTION

The present invention provides an extremely compact, simple, low-power, potentially inexpensive laser with extremely short, high-peak-power pulses. It is an improvement on the coupled-cavity Q-switched laser which optimizes the short-pulse performance of the device, and consequently, maximizes the peak power for a given amount of pump power. In the prior art of coupled-cavity Q-switched lasers, the devices have always been operated in the regime of low round-trip gain (relatively long pulse durations). There has been no demonstrated understanding (experimentally or theoretically) of the effect of the length of the etalon cavity (the cavity not containing the gain medium) and the reflectivities of its individual mirrors on the duration of the output pulse. Such an understanding is essential if coupled-cavity Q-switched lasers are to produce pulses of less than 100-ps duration. This invention provides a method for optimizing the device parameters to obtain the minimum possible pulse duration.

In accordance with the invention, pulses of less than 50-ps duration can be produced in Nd:YAG-based picosecond Q-switched microlasers. The peak powers of such devices could exceed 1 MW. Thus, picosecond Q-switched microlasers can produce output pulses as short as large mode-locked lasers with peak powers as high as commercially available Q-switched systems. The entire device can fit into a package approximately the size of a standard diode laser package with the possibility of battery-powered operation. With this combination of attributes, picosecond Q-switched microlasers can replace larger, more expensive lasers in many of their current applications. In addition, they will make new applications commercially viable. Picosecond Q-switched microlasers have the potential to revolutionize pulsed lasers and laser applications in the same way that diode lasers have revolutionized cw laser applications.

A picosecond Q-switched microlaser according to this invention comprises a gain medium disposed within a first resonant cavity and a second resonant cavity disposed adjacent to the first cavity and sharing a common partially transmitting mirror with said first cavity. The optical path length (physical length times refractive index) of the second cavity is selected to be nearly an integral multiple of the optical path length of said first cavity. The optical path length of the second cavity may be varied using any of the mechanisms discussed in U.S. Pat. No. 4,982,405, incorporated herein by reference. Tuning of the cavity length enables the Q of the first resonant cavity containing the gain medium to be controlled. The lengths of the first and second cavities and the reflectivities of the mirrors are determined, in accordance with the invention, such that pulses of less than 100-ps duration can be obtained.

DESCRIPTION OF THE PREFERRED EMBODIMENT

Figure 1:
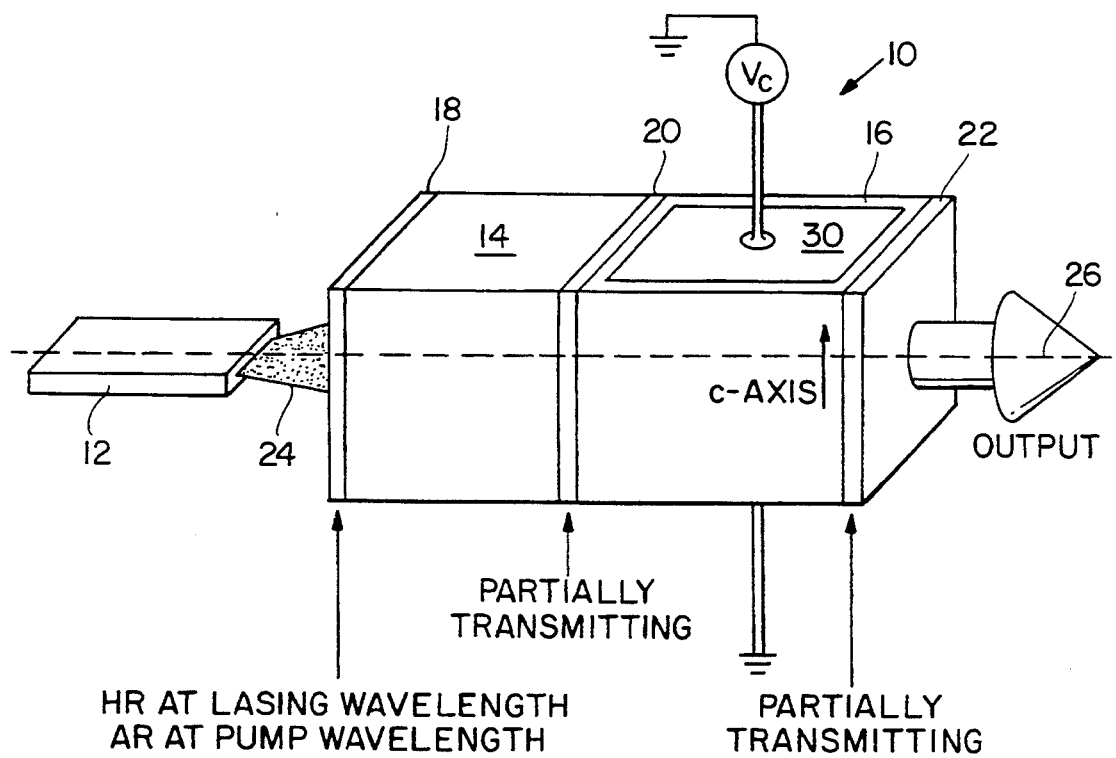
FIG. 1 is a schematic perspective view of a first embodiment of the invention.

Referring to FIG. 1, one embodiment of the picosecond Q-switched microlaser 10 of the invention consists of a short piece of gain medium 14, for example, Nd:YAG, bonded to an electrooptic crystal 16, for example, LiTaO$_3$. Both materials are polished flat and parallel on the two faces normal to the optic axis 26. The pump-side face of the gain medium 14 is coated dielectrically to form a mirror 18, which transmits the pump light 24 and is highly reflective at the oscillating frequency $v_l$ of the microlaser 10. The facets at the interface between the two materials and the output face of the electrooptic crystal are coated to form partially reflecting mirrors 20 and 22, respectively, with reflectivities $R_1$ and $R_2$, respectively, at the lasing frequency. Electrodes are deposited on the appropriate two faces of the electrooptic crystal 16 so that its refractive index can be modulated by a control voltage $V_c$.

The principle behind the operation of the Q-switched microlaser is that the electrooptic etalon (defined by the two mirrors 20/22 adjacent to the electrooptic material) serves as a variable output coupler for the gain cavity (defined by the two mirrors 18/20 adjacent to the gain medium). The potential lasing modes of the device are determined primarily by the gain cavity. In the hold-off (nonlasing) state, the variable etalon must have a high transmission for all potential lasing modes so that none can reach threshold. To assure that all modes of the gain cavity can be simultaneously suppressed (if the gain cavity can reach threshold for more than 1 longitudinal mode), the optical length of the etalon must be nearly an integral multiple of the optical length of the gain cavity. In the lasing state, the reflectivity of the etalon is high for the desired mode and a Q-switched output pulse develops. By continuously pumping the microlaser with a light source 12, such as a diode laser, and periodically changing the reflectivity of the etalon, a periodic train of short pulses is produced at output mirror 22.

The basic requirement for forming picosecond Q-switched lasers in accordance with the invention is as follows: The shortest pulse (full width at half-maximum $t_w$) is obtained when the total round-trip loss ($\Gamma_{rt}$) of the laser cavity in the lasing state is given by:

$$\Gamma_{rt} = 1 - G_{rt}^{-\gamma}, \tag{1}$$

where $G_{rt}$ is the small-signal round-trip gain of the cavity when the pulse begins to form and $\gamma = 0.32$. (If falls in the range from 0.06 to 0.6, the pulsewidth will be within a factor of 2 of the minimum possible width.) The minimum pulsewidth is:

$$t_w = \frac{8.1 t_{rt}}{\ln(G_{rt})}, \tag{2}$$

where $t_{rt}$ is the round-trip time of light within the laser cavity. This simple expression makes it easy to see why microlasers outperform other Q-switched lasers—their short length results in a short cavity round-trip time.

Before Equation 2 can be applied to coupled-cavity Q-switched microlasers, we must have an expression for the effective round-trip time of light in the laser cavity. For low-gain operation [$\ln(G_{rt}) << 1$], the effective round-trip time of a properly optimized system is approximately the round-trip time of the gain cavity ($t_{rt,g}$). In high-gain systems, the transit time of light in the etalon (round-trip time $t_{rt,et}$) affects the behavior of the Q-switched microlaser in two ways. After leaving the gain cavity, light must escape the etalon, which has an associated decay time. Also, the reflectivity of the etalon as seen by the gain cavity (and, therefore, the round-trip loss $\Gamma_{rt}$ of the gain cavity) is dynamically dependent on the rate of formation and decay of the pulse. In a laser optimized for short-pulse performance, both of these effects can be accounted for by using an effective cavity length of:

$$t_{rt} = t_{rt,g}\left[1 - 0.32m \frac{\ln(G_{rt})}{\ln(R_2)}\right], \tag{3}$$

where $m = t_{rt,et}/t_{rt,g}$ is a small integer.

In order to hold off lasing in the presence of amplified spontaneous emission (under the assumption of negligible parasitic loss within the laser cavity), the reflectivities of the etalon mirrors ($R_1$ and $R_2$) must satisfy the relation:

$$\frac{(1 - R_1)(1 - G_{rt}^{-m}R_2)}{1 + G_{rt}^{-m}R_1R_2 - 2\sqrt{G_{rt}^{-m}R_1R_2}} \leq 1 - G_{rt}^{-1}. \tag{4}$$

The pulsewidth of the laser is determined by the reflectivity of the etalon near the peak of the pulse, where the amplitude of the pulse is relatively constant. During this period of time, the reflectivity of the etalon as seen by the gain cavity is nearly the same as the reflectivity for continuous-wave (cw) light. Thus, the etalon reflectivity that produces the minimum pulsewidth is determined by the cw reflectivity of the etalon and Equation 1. In light of Equations 2 and 3, the optimal reflectivities for the individual etalon mirrors correspond to the minimum value of $R_2$ that can satisfy Equation 1 subject to Relation 4. These considerations result in a pair of equations for the values of $R_1$ and $R_2$ that minimize the output pulse from a coupled-cavity Q-switched laser:

$$\frac{(1 - R_1)(1 - G_{rt}^{-m}R_2)}{1 + G_{rt}^{-m}R_1R_2 - 2\sin(\pi\nu_1\delta_1)\sqrt{G_{rt}^{-m}R_1R_2}} = 1 - G_{rt}^{-1}, \tag{5}$$

$$\frac{(1 - R_1)(1 - R_2)}{1 + R_1R_2 + 2\sin(\pi\nu_1\delta_2)\sqrt{R_1R_2}} = 1 - G_{rt}^{-\gamma}, \tag{6}$$

where $\delta_1 + \delta_2 = \delta(t_{rt,et}) \leq 1/\nu_l$ is the total change in the round-trip time of the electrooptic etalon induced during Q switching.

Whereas Equations 5 and 6 specify the values of $R_1$ and $R_2$ that result in the minimum-duration output pulse, the right-hand side of Equation 5 may be decreased by a factor of 2 without greatly affecting the duration of the output pulse; $\gamma$ may be varied over the range from 0.06 to 0.6.

Figure 2:
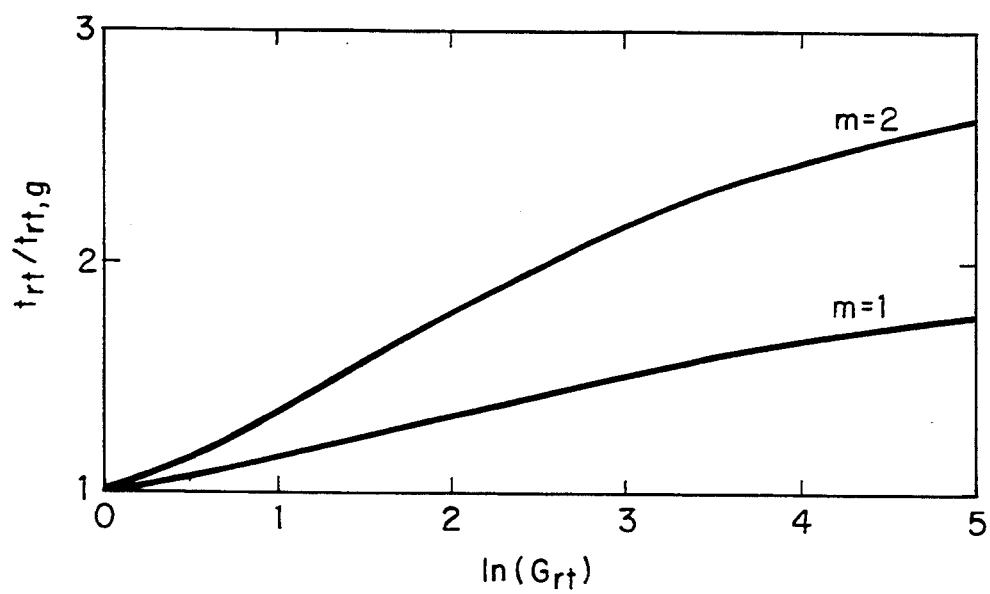
FIG. 2 is a plot of the normalized effective round-trip time of light within the laser cavity versus gain for a Q-switched microlaser of the invention.

FIG. 2 is a plot of the normalized effective round-trip time of light within the laser cavity for an optimized system with $\delta_1 = \delta_2 = \frac{1}{2}\nu_l$ as a function of gain for $m = 1$ and 2. Under these conditions, at high gain, the round-trip time asymptotically approaches the sum of the round-trip times for the gain cavity and the etalon.

There are several factors that potentially limit the minimum pulsewidth obtainable from a microlaser. Gain medium dependent factors include the maximum inversion density (gain) obtainable for the available pump power and the gain bandwidth. The electrooptic coefficient in the etalon can place restrictions on the length (round-trip time) of the etalon, given the maximum electric field that can be applied. The rise time of the voltage applied to the electrooptic material should not be longer than the build-up time of the pulse. Finally, the large optical intensities that result from extremely short pulses may cause damage to the gain medium, electrooptic material, or mirrors. None of these factors, however, become limiting until the duration of the output pulse from a Nd-based microlaser is less than 100 ps. Applying Equations 5 and 6, subject to the foregoing cautionary notes, one can obtain the minimum possible pulsewidth from a coupled-cavity Q-switched microlaser.

To illustrate the capabilities of a picosecond Q-switched microlaser, consider a 1-mm long piece of Nd:YAG (gain cross-section $\sigma = 4.6 \times 10^{-19}$ cm$^2$, spontaneous lifetime $\tau = 240$ μs, index n=1.82) bonded to a piece of LiTaO$_3$ (electrooptic coefficient $r_{33} = 30.3 \times 10^{-12}$ m/V, index n=2.14) of the same optical length, pumped by a focused 2-W 808-nm cw diode laser. The gain medium will absorb at least 1 W of incident pump power within the lasing-mode volume (of $\sim 100$-μm radius). At low pulse repetition rates (less than $1/\tau$), the resulting small-signal round-trip gain for lasing at 1.064 μm is about 17. If we use $\delta_1 = \delta_2 = \frac{1}{2}\nu_l$, short-pulse operation is optimized for $R_1 = 0.074$ and $R_2 = 0.195$, with a pulsewidth of 51.6 ps. Using a quantum extraction efficiency of 50%, we derive a pulse energy of 91 μJ, a peak power of 1.5 MW (using the theoretical pulse shape), and a peak (unfocused) output intensity of 4.8 GW/cm$^2$. This output intensity is sufficient to result in efficient nonlinear frequency generation in an appropriate nonlinear crystal without focusing the output beam of the laser. The focused peak powers are sufficient for ionization of many materials, with applications in micromachining, microsurgery, and ionization spectroscopy. The extremely short pulsewidth makes the device attractive for high-precision optical ranging, with applications in robotic vision and automated production.

EQUIVALENTS

Having described one embodiment, those skilled in the art will realize many variations are possible which will still be within the scope and spirit of the claimed invention. Therefore, it is the intention to limit the invention only as indicated by the scope of the claims.

For example, equivalent gain media may comprise any of the following: non-stoichiometric materials, such as Nd:YVO$_4$, Nd:YLF, Tm:YVO$_4$, Tm:Ho:YLF, Tm:Ho:YAG; or stoichiometric materials, such as LNP or NPP. The tuneable second resonator cavity may comprise acoustooptic, magnetoptic, or nonlinear optic cavities. Equivalent electrooptic materials may comprise LiNbO$_3$, KNbO$_3$, Ba$_2$NaNb$_5$O$_{15}$. Equivalent pump sources may comprise lamps or other laser devices.

What is claimed is:

1. A coupled-cavity Q-switched laser system for generating a short pulse of light comprised of a gain medium disposed within a first resonant cavity, a second resonant cavity sharing a common partially reflecting mirror with said first cavity, and a means for changing the relative optical length of the second resonant cavity with respect to the first, said second cavity having an output mirror which provides feedback to said first resonant cavity through said partially reflecting mirror such that by changing said optical length the quality Q of said first resonant cavity is changed, and wherein the reflectivities of the partially reflecting mirror and said output mirror are determined by the following formulas:

$$\frac{(1 - R_1)(1 - G_{rt}^{-m}R_2)}{1 + G_{rt}^{-m}R_1R_2 - 2\sin(\pi\nu_l\delta_1)\sqrt{G_{rt}^{-m}R_1R_2}} \leq 1 - G_{rt}^{-1},$$

and $$\frac{(1 - R_1)(1 - R_2)}{1 + R_1R_2 + 2\sin(\pi\nu_l\delta_2)\sqrt{R_1R_2}} = 1 - G_{rt}^{-\gamma},$$

where $\gamma$ is in the range from 0.06 to 0.6, $R_1$ is the reflectivity of said partially reflecting mirror, $R_2$ is the reflectivity of said output mirror, $G_{rt}$ is the small-signal round-trip gain of the first cavity at the time the pulse begins to form, m is the ratio of the round-trip time of light in the second cavity to the round-trip time of light in the first cavity, $\nu_l$ is the lasing frequency, and $\delta_1 + \delta = \delta(t_{rt,et})$ is the relative change in said optical length induced during Q switching.

2. The coupled-cavity Q-switched laser system of claim 1 wherein the laser is Q switched to produce an output pulse of less than 100-ps duration.

3. The coupled-cavity Q-switched laser system of claim 1 in which a peak output power of at least 100 kW is produced.

4. The coupled-cavity Q-switched laser system of claim 1 in which the first cavity is less than about 1 mm in length.

5. The coupled-cavity Q-switched laser of claim 1 in which the gain medium is a solid-state material.

6. The coupled-cavity Q-switched laser system of claim 1 in which an electrooptic material is used to change the relative optical length of the second resonant cavity with respect to the first.

7. The coupled-cavity Q-switched laser system of claim 5 in which the gain medium is comprised of Nd:YAG.

8. The coupled-cavity Q-switched laser system of claim 5 in which the gain medium is comprised of Nd:YVO$_4$.

9. The coupled-cavity Q-switched laser system of claim 6 in which the electrooptic material is LiTaO$_3$.

10. The coupled-cavity Q-switched laser system of claim 6 in which the electrooptic material is LiNbO$_3$.

11. The coupled-cavity Q-switched laser of claim 1 in which the gain medium is optically pumped by a diode laser.

12. A method utilizing the coupled-cavity Q-switched laser system of claim 1 for one of the processes taken from the group comprising: micromachining, microsurgery, high-precision ranging, robotic vision, automated production, ionization spectroscopy, nonlinear frequency generation, and white-light generation.

13. A method of forming a coupled-cavity Q-switched laser system for generating a short pulse of light comprising the steps of: forming a first resonant cavity containing a laser gain medium and a second resonant cavity sharing a common partially reflecting mirror with said first cavity, and providing a means for changing the relative optical length of the second resonant cavity with respect to the first, said second resonant cavity having an output mirror which provides feedback to said first resonant cavity through said partially reflecting mirror such that by changing said optical length the quality Q of said first resonant cavity is changed, and wherein the reflectivities of the partially reflecting mirror and said output mirror are determined by the following formulas:

$$\frac{(1 - R_1)(1 - G_{rt}^{-m}R_2)}{1 + G_{rt}^{-m}R_1R_2 - 2\sin(\pi\nu_l\delta_1)\sqrt{G_{rt}^{-m}R_1R_2}} \leq 1 - G_{rt}^{-1},$$

and $$\frac{(1 - R_1)(1 - R_2)}{1 + R_1R_2 + 2\sin(\pi\nu_l\delta_2)\sqrt{R_1R_2}} = 1 - G_{rt}^{-\gamma},$$

where $\gamma$ is in the range from 0.06 to 0.6, $R_1$ is the reflectivity of said partially reflecting mirror, $R_2$ is the reflectivity of said output mirror, $G_{rt}$ is the small-signal round-trip gain of the first cavity at the time the pulse begins to form, m is the ratio of the round-trip time of light in the second cavity to the round-trip time of light in the first cavity, $\nu_l$ is the lasing frequency, and $\delta_1 + \delta_2 = \delta(t_{rt,et})$ is the relative change in said optical length induced during Q-switching.

14. The method claim 13 wherein the laser system is adapted to be Q switched to produce an output pulse of less than 100-ps duration.

15. The method of claim 13 in which the laser is adapted to produce a peak output power of at least 100 kW.

16. The method of claim 13 in which the first cavity is less than about 1 mm in length.

17. The method of claim 13 in which the gain medium is a solid-state material.

18. The method of claim 13 in which an electrooptic material is used to change the relative optical length of the second resonant cavity with respect to the first.

19. The method of claim 17 in which the gain medium is comprised of Nd:YAG.

20. The method of claim 17 in which the gain medium is comprised of Nd:YVO$_4$.

21. The method of claim 18 in which the electrooptic material is LiTaO$_3$.

22. The method of claim 18 in which the electrooptic material is LiNbO$_3$.

23. The method of claim 13 in which the gain medium is optically pumped by a diode laser.

24. A solid-state coupled-cavity Q-switched laser system for generating a short pulse of light comprised of a first resonant cavity formed of a solid-state gain medium having an input facet with an input mirror formed thereon and an output facet with a partially reflecting mirror formed thereon, a second resonant cavity providing optical feedback to the first cavity, said second cavity formed of a second solid-state material with a variable optical length having a front facet disposed adjacent to said partially reflecting mirror and a back facet with an output mirror formed thereon, and a means for controlling the length of said second solid-state material, wherein by changing the optical length of said second solid-state material the quality Q of said first resonant cavity is changed, and wherein the reflectivities of the partially reflecting mirror and said output mirror are determined by the following formulas:

$$\frac{(1 - R_1)(1 - G_{rt}^{-m} R_2)}{1 + G_{rt}^{-m} R_1 R_2 - 2\sin(\pi \nu_1 \delta_1) \sqrt{G_{rt}^{-m} R_1 R_2}} \leq 1 - G_{rt}^{-1},$$

and $$\frac{(1 - R_1)(1 - R_2)}{1 + R_1 R_2 + 2\sin(\pi \nu_1 \delta_2) \sqrt{R_1 R_2}} = 1 - G_{rt}^{-\gamma},$$

where $\gamma$ is in the range from 0.06 to 0.6, $R_1$ is the reflectivity of said partially reflecting mirror, $R_2$ is the reflectivity of said output mirror, $G_{rt}$ is the small-signal round-trip gain of the first cavity at the time the pulse begins to form, m is the ratio of the round-trip time of light in the second cavity to the round-trip time of light in the first cavity, $\nu_l$ is the lasing frequency, and $\delta_1 + \delta_2 = \delta(t_{rt,et})$ is the relative change in said optical length induced during Q switching.

25. A method of forming a solid-state coupled-cavity Q-switched laser system for generating a short pulse of light comprising the steps of: forming a first resonant cavity of a solid-state gain medium having an input facet with an input mirror formed thereon and an output facet with a partially reflecting mirror formed thereon and a second resonant cavity to provide optical feedback to the first cavity, said second cavity formed of a second solid-state material with a variable optical length having a front facet disposed adjacent to said partially reflecting mirror and a back facet with an output mirror formed thereon, and providing a means for controlling the length of said second solid-state material, wherein by changing the optical length of said second solid-state material the quality Q of said first resonant cavity is changed, and wherein the reflectivities of the partially reflecting mirror and said output mirror are determined by the following formulas:

$$\frac{(1 - R_1)(1 - G_{rt}^{-m} R_2)}{1 + G_{rt}^{-m} R_1 R_2 - 2\sin(\pi \nu_1 \delta_1) \sqrt{G_{rt}^{-m} R_1 R_2}} \leq 1 - G_{rt}^{-1},$$

and $$\frac{(1 - R_1)(1 - R_2)}{1 + R_1 R_2 + 2\sin(\pi \nu_1 \delta_2) \sqrt{R_1 R_2}} = 1 - G_{rt}^{-\gamma},$$

where $\gamma$ is in the range from 0.06 to 0.6, $R_1$ is the reflectivity of said partially reflecting mirror, $R_2$ is the reflectivity of said output mirror, $G_{rt}$ is the small-signal round-trip gain of the first cavity at the time the pulse begins to form, m is the ratio of the round-trip time of light in the second cavity to the round-trip time of light in the first cavity, $\nu_l$ is the lasing frequency, and $\delta_1 + \delta_2 = \delta(t_{rt,et})$ is the relative change in said optical length induced during Q switching.

* * * * *

UNITED STATES PATENT AND TRADEMARK OFFICE
CERTIFICATE OF CORRECTION

PATENT NO. : 5,381,431
DATED : January 10, 1995
INVENTOR(S) : John J. Zayhowski

It is certified that error appears in the above-indentified patent and that said Letters Patent is hereby corrected as shown below:

Col. 5, line 58, delete "$\delta_1 + \delta$" and insert ---$\delta_1 + \delta_2$---.

Signed and Sealed this

Twenty-eight Day of March, 1995

Attest:

BRUCE LEHMAN

*Attesting Officer*     *Commissioner of Patents and Trademarks*